United States Patent
Nakao et al.

(10) Patent No.: US 10,467,976 B2
(45) Date of Patent: Nov. 5, 2019

(54) DRIVE CIRCUIT FOR DISPLAY DEVICE AND DISPLAY DEVICE

(71) Applicant: JAPAN DISPLAY INC., Minato-ku (JP)

(72) Inventors: Takayuki Nakao, Tokyo (JP); Takehiro Shima, Tokyo (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

(21) Appl. No.: 16/422,097

(22) Filed: May 24, 2019

(65) Prior Publication Data
US 2019/0279587 A1 Sep. 12, 2019

Related U.S. Application Data

(63) Continuation of application No. 15/333,698, filed on Oct. 25, 2016, now Pat. No. 10,347,206.

(30) Foreign Application Priority Data

Oct. 30, 2015 (JP) ................................. 2015-214558

(51) Int. Cl.
*G09G 3/36* (2006.01)
*G09G 3/20* (2006.01)
(Continued)

(52) U.S. Cl.
CPC ......... *G09G 3/3655* (2013.01); *G09G 3/2096* (2013.01); *G09G 3/3406* (2013.01);
(Continued)

(58) Field of Classification Search
CPC .. G09G 3/3655; G09G 3/2096; G09G 3/3406; G09G 3/3607; G09G 3/3648; G09G 3/3614
See application file for complete search history.

(56) References Cited

U.S. PATENT DOCUMENTS 5,712,652 A 1/1998 Sato et al.
6,850,216 B2 2/2005 Akimoto
(Continued)

FOREIGN PATENT DOCUMENTS

| CN | 101281737 A | 10/2008 |
|----|---|---|
| JP | 2005-18088 | 1/2005 |
| JP | 2008-256762 | 10/2008 |
| JP | 2013-186294 | 9/2013 |
| TW | 311213 B | 7/1997 |

OTHER PUBLICATIONS

Chinese Office Action dated Dec. 5, 2018 in CN Application No. 2016109594945 with partial English translation, 11 pages.

*Primary Examiner* — Ricardo Osorio
(74) *Attorney, Agent, or Firm* — Oblon, McClelland, Maier & Neustadt, L.L.P.

(57) ABSTRACT

According to one embodiment, a drive circuit for a display device includes a plurality of pixels. Each of the pixels includes a memory, and a display element driven based on output data of the memory. The drive circuit includes a storage control circuit for storing, in the memory, the data from a signal line, and a display control circuit which provides the display element with a display signal or a non-display signal based on the data stored in the memory. The drive circuit changes a display area from a first display state to a second display state. When the drive circuit sets the display area to the second display state, the drive circuit supplies a signal which does not depend on the image data to the display element.

8 Claims, 19 Drawing Sheets

(51) Int. Cl.
  *G09G 5/39* (2006.01)
  *G09G 3/34* (2006.01)
  *G06Q 30/02* (2012.01)

(52) U.S. Cl.
  CPC ......... *G09G 3/3607* (2013.01); *G09G 3/3648* (2013.01); *G09G 5/39* (2013.01); *G06Q 30/0241* (2013.01); *G09G 3/3614* (2013.01); *G09G 2300/0452* (2013.01); *G09G 2300/0857* (2013.01); *G09G 2310/06* (2013.01); *G09G 2310/063* (2013.01); *G09G 2330/021* (2013.01); *G09G 2370/16* (2013.01); *G09G 2380/04* (2013.01)

(56) References Cited

U.S. PATENT DOCUMENTS

| | | |
|---|---|---|
| 7,173,589 B2 | 2/2007 | Senda |
| 8,743,093 B2 | 6/2014 | Toya |
| 2003/0016202 A1 | 1/2003 | Edwards |
| 2004/0080521 A1 | 4/2004 | Nose |
| 2004/0189578 A1 | 9/2004 | Lin |
| 2007/0080905 A1 | 4/2007 | Takahara |
| 2008/0238855 A1 | 10/2008 | Teranishi et al. |
| 2011/0140108 A1 | 6/2011 | Kimura |
| 2013/0307421 A1 | 11/2013 | Tanada |
| 2015/0185579 A1 | 7/2015 | Koyama |
| 2017/0124973 A1* | 5/2017 | Nakao .................. G09G 3/3607 |

\* cited by examiner

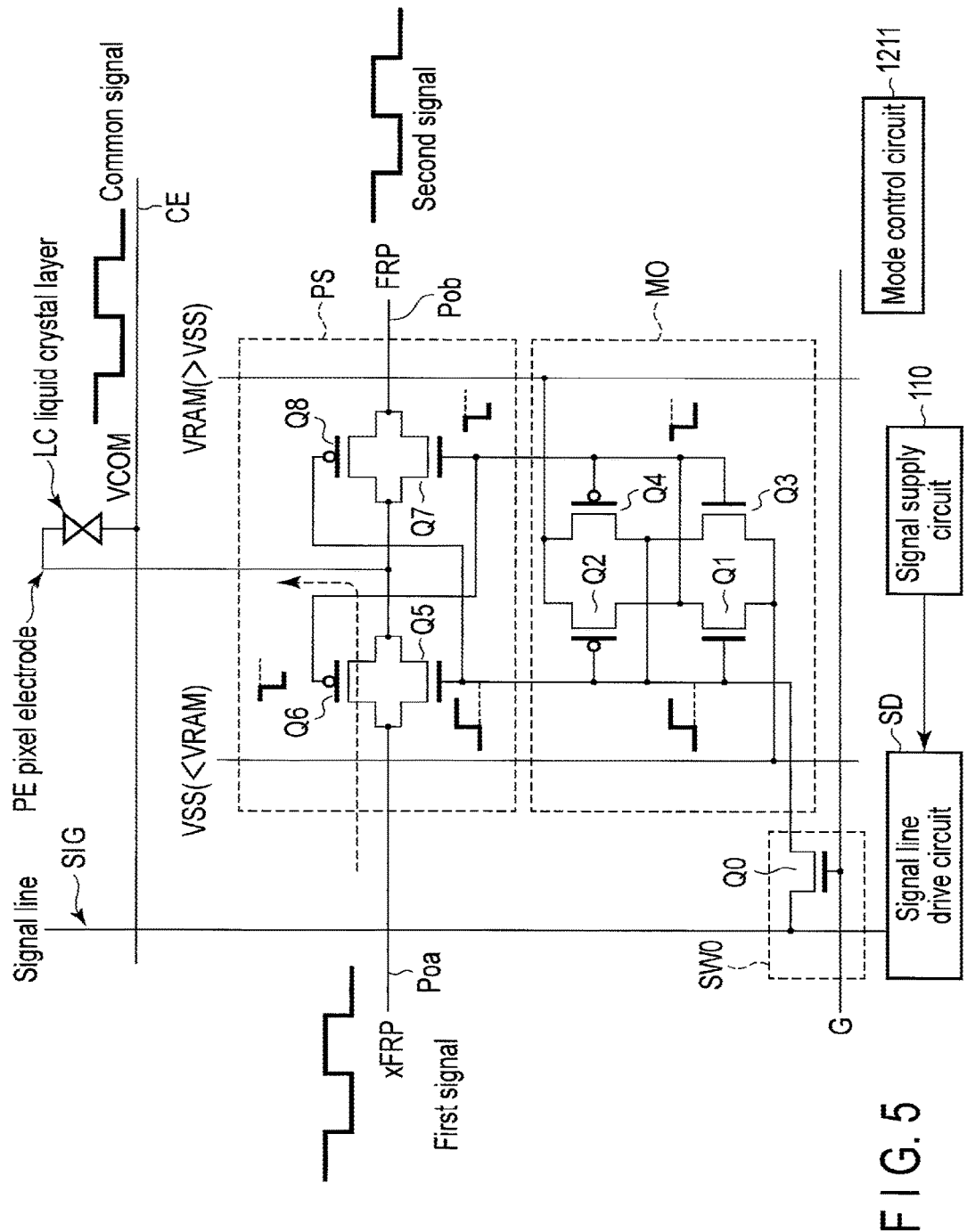
F I G. 5

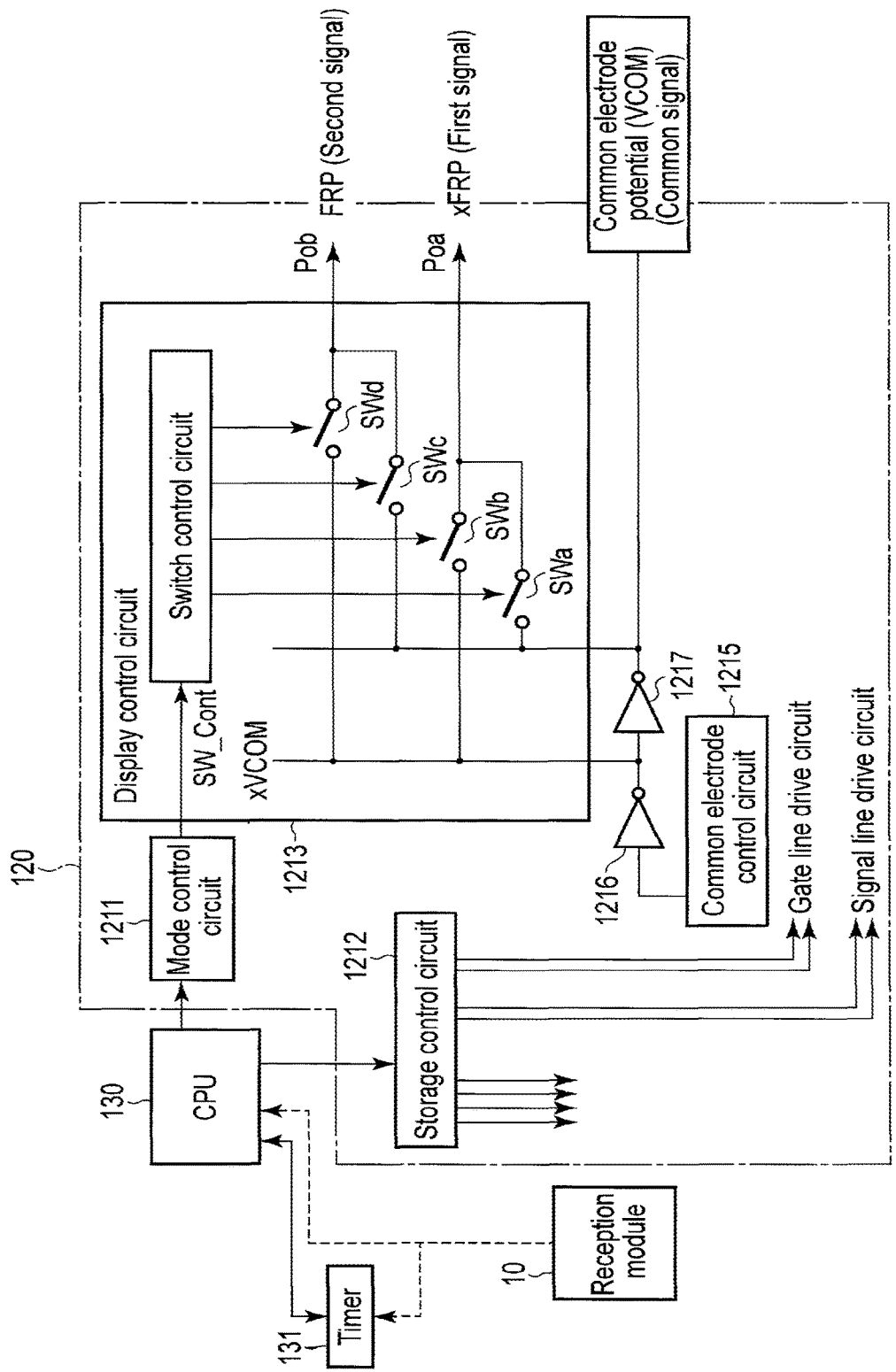
F I G. 7

| Display state | SWa | SWb | SWc | SWd |
|---|---|---|---|---|
| Normal display | Off | On | On | Off |
| Black display | On | Off | On | Off |
| White display | Off | On | Off | On |
| Inverted display | On | Off | Off | On |

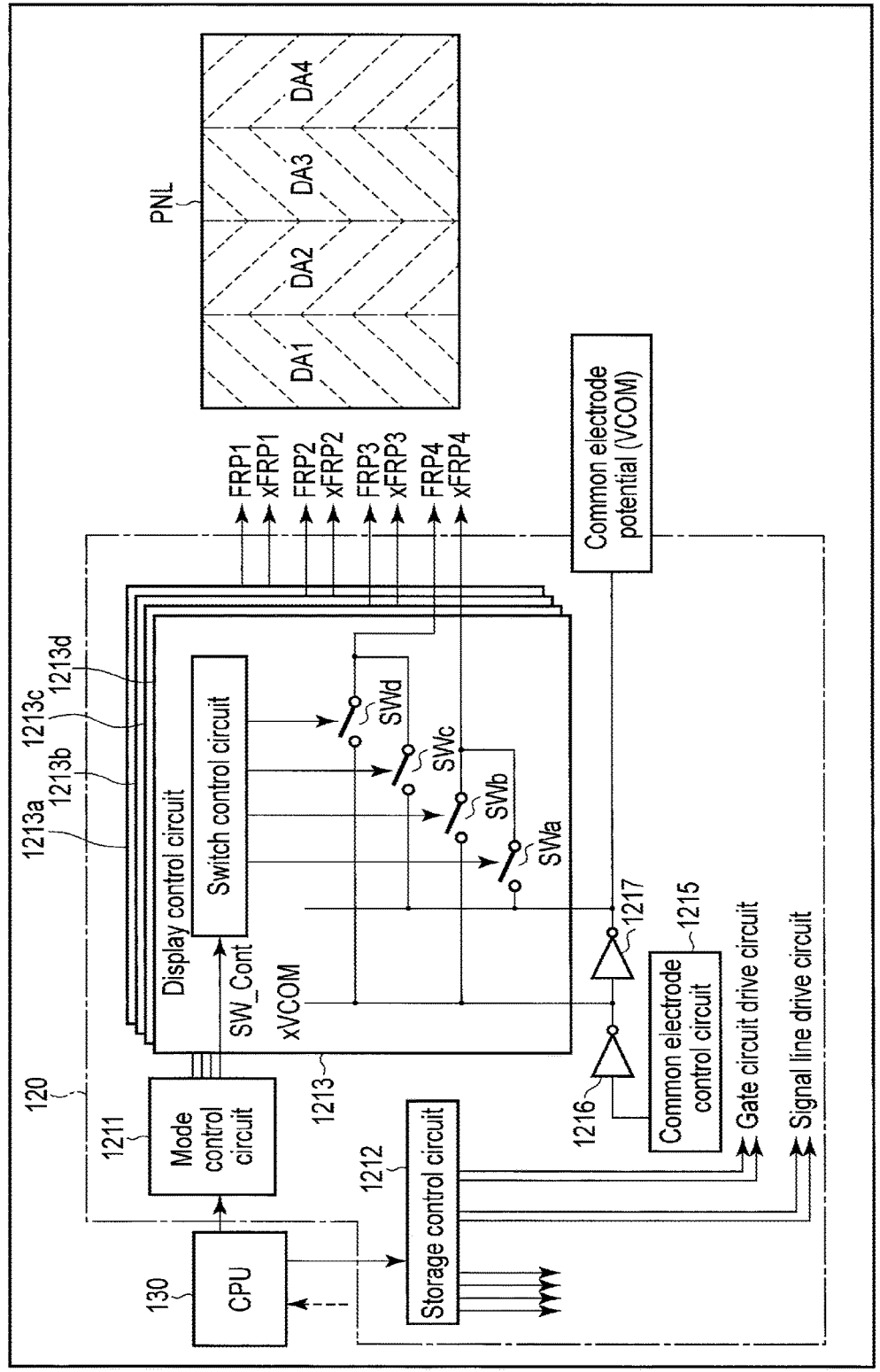
F I G. 11

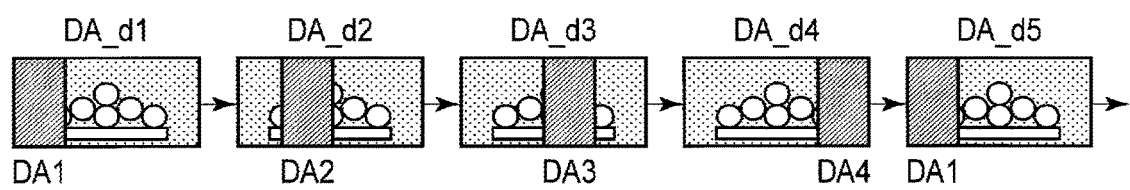
F I G. 12A
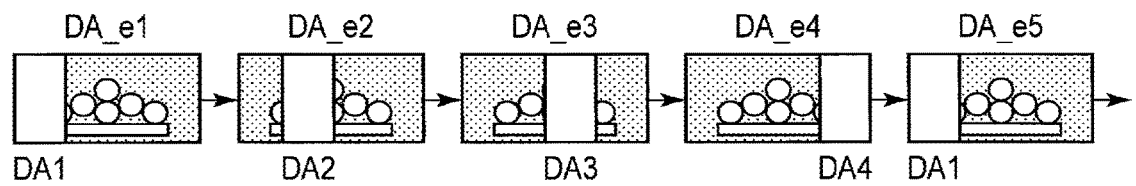
F I G. 12B

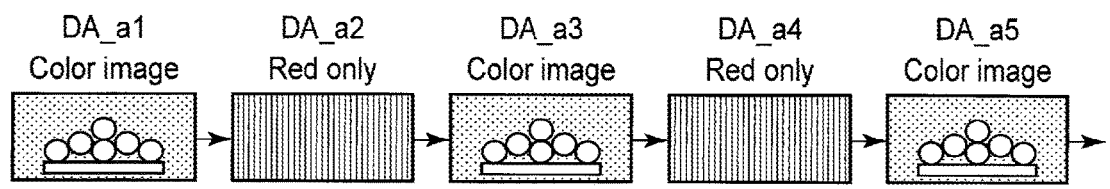
F I G. 14A
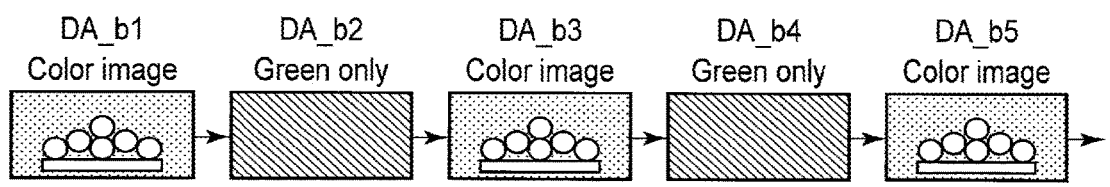
F I G. 14B
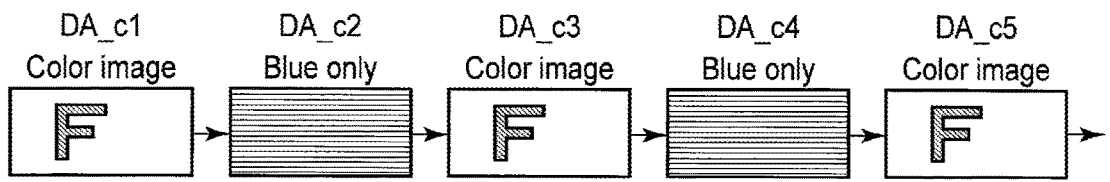
F I G. 14C

|  | Grada-tion Y1 | Grada-tion Y2 | Grada-tion Y3 | Grada-tion Y4 | Grada-tion Y5 | Grada-tion Y6 | Grada-tion Y7 | Grada-tion Y8 |
|---|---|---|---|---|---|---|---|---|
| PE(YA) | 0 | 1 | 0 | 1 | 0 | 1 | 0 | 1 |
| PE(YB) | 0 | 0 | 1 | 1 | 1 | 0 | 1 | 1 |
| PE(YC) | 0 | 0 | 0 | 0 | 1 | 1 | 1 | 1 |
F I G. 19B
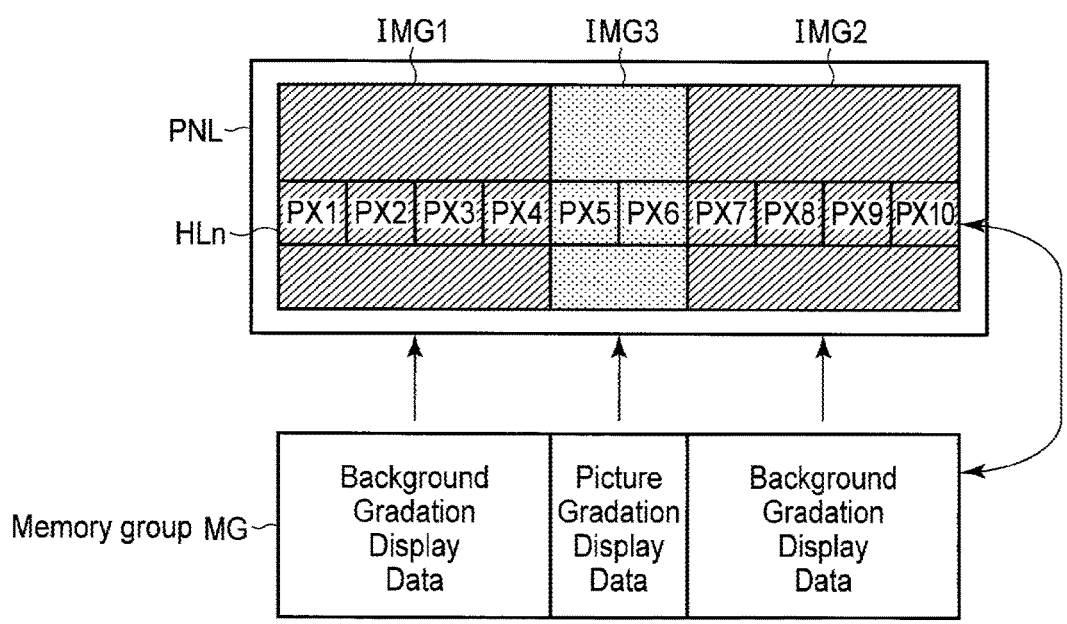
F I G. 20A

DRIVE CIRCUIT FOR DISPLAY DEVICE AND DISPLAY DEVICE

CROSS-REFERENCE TO RELATED APPLICATIONS

This application is continuation of U.S. Ser. No. 15/333,698, filed Oct. 25, 2016 and claims the benefit of priority from Japanese Patent Application No. 2015-214558, filed Oct. 30, 2015, the entire contents of each of which are incorporated herein by reference.

FIELD

Embodiments described herein relate generally to a drive circuit for a display device, and a display device.

BACKGROUND

In a liquid crystal display devices which has a color display panel, pixels are arranged in a row direction (X-direction) and a column direction (Y-direction). The X-direction intersects with the Y-direction. Each pixel (which may be referred to as a pixel circuit) comprises a color filter and functions as a red (R) subpixel, a green (G) subpixel or a blue (B) subpixel.

Display panels comprising a memory in each subpixel have been developed.

In each liquid crystal display device, for example, gate lines parallel to the X-direction are arranged at regular intervals in the Y-direction. Source lines parallel to the Y-direction are arranged at regular intervals in the X-direction. The pixels are provided near the respective intersections between the gate lines and the source lines.

Some liquid crystal display devices comprise a digital memory in each subpixel. This type of liquid crystal display device does not need to frequently supply voltage to all the source lines (in other words, does not need to rewrite pixel signals) when a static image is displayed in the entire display area of the device for a long time. Thus, power consumption can be reduced in the device. In addition, when a static image is displayed in a part of the display area, and moving images are displayed in the remaining part, there is no need to frequently apply voltage to all the source lines. In this case, voltages (in other words, pixel signals for moving images) need to be applied to the source lines of the partial area in which the moving images are displayed. In this manner, power consumption can be reduced in the device.

In some cases, the whole screen of the display device should be switched to, for example, white display or black display at once. If the normal image display has been switched to black or white display on the whole screen, the eye-catching effect or highlighting effect can be enhanced in the display device. For example, when the above display switching is performed by a display device which shows the information of an item of merchandise on a display shelf at a store, it is possible to draw the attention of customers to the commodity.

To perform the display switching, the memory data of subpixels of the entire display area need to be rewritten to data for black or white. In a case of active-matrix driving, a line is specified perpendicularly in series. In this manner, data for black or white is written to each line. Thus, time is required to complete rewriting the whole screen. In addition, power is consumed during this period. If the frequency of rewriting is slow, images in the process of rewriting are visually recognized as an image lag.

BRIEF DESCRIPTION OF THE DRAWINGS

FIG. 5 is a circuit diagram showing the details of the circuit structure shown in FIG. 2A.

FIG. 7 is a circuit diagram showing an example of the specific structure of a drive circuit according to the embodiment.

FIG. 11 is a circuit diagram showing an example of the specific structure of the drive circuit according to another embodiment.

FIG. 12A shows an example when a particular display is performed in the display panel according to the embodiment.

FIG. 12B shows another example when a particular display is performed in the display panel according to the embodiment.

FIG. 14A shows a display example when a particular display is performed in the display device using the pixels shown in FIG. 13.

FIG. 14B shows another display example when a particular display is performed in the display device using the pixels shown in FIG. 13.

FIG. 14C shows another display example when a particular display is performed in the display device using the pixels shown in FIG. 13.

FIG. 19B is shown for explaining the gradation types which can be exhibited by the subpixel shown in FIG. 19A.

FIG. 20A is shown for explaining a display example of a display panel which can exhibit gradation.

DETAILED DESCRIPTION

Figure 1:
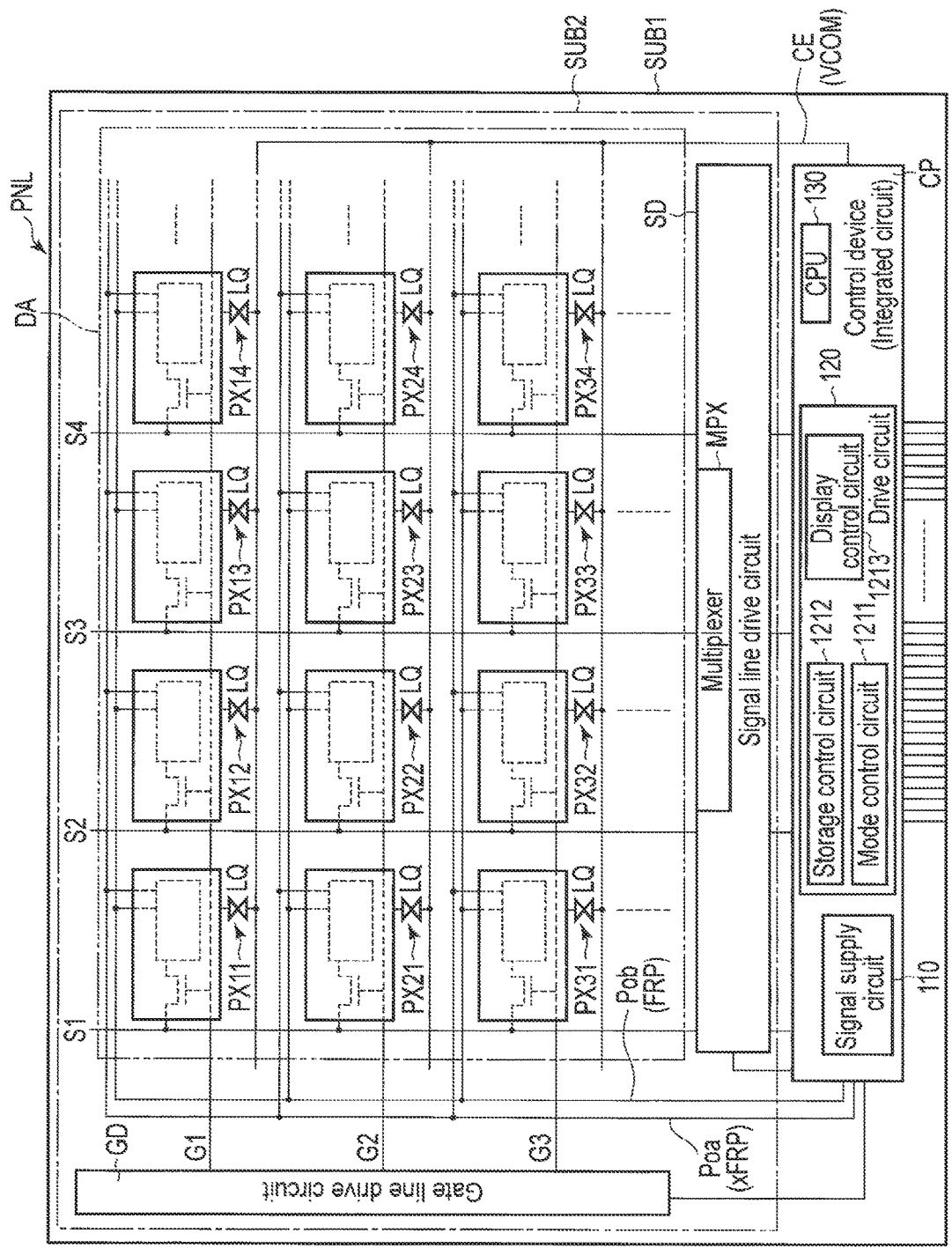
FIG. 1 schematically shows the structures of a signal supply circuit and a display device as a whole according to one embodiment.

In general, according to one embodiment aims to provide a drive circuit for a display device which is capable of concurrently and instantaneously changing the display in a predetermined area (the entire screen area or a part of the entire area) for approximately several microseconds to several tens of seconds by a simple operation while realizing reduction in power consumption. The embodiment also aims to provide such a display device.

According to one embodiment of the present disclosure, a drive circuit for a display device comprises a plurality of pixels. Each of the pixels includes a memory for storing a digital signal based on image data, and a display element driven based on output data of the memory. The drive circuit further comprises a storage control circuit for storing, in the memory, the data from a signal line corresponding to the memory, and a display control circuit which provides the display element corresponding to the memory with a display signal or a non-display signal based on the data stored in the memory. The drive circuit changes a display area from a first display state to a second display state. When the drive circuit sets the display area to the second display state, the drive circuit supplies a signal which does not depend on the image data to the display element.

An Embodiment will further be described with reference to the drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 schematically shows an example of the structure of a display panel PNL. A display device comprises an active-matrix display panel PNL. The display panel PNL comprises a first substrate SUB1, a second substrate SUB2 facing the first substrate SUB1, and a liquid crystal layer LQ held between the first substrate SUB1 and the second substrate SUB2. The second substrate SUB2 is indicated by alternate long and short dashed lines.

A display area DA is equivalent to the area in which the liquid crystal layer LQ is held between the first substrate SUB1 and the second substrate SUB2. The display area DA is, for example, rectangular. In this area, a plurality of subpixels PX (PX11, PX12, . . . ) are arranged in matrix.

The first substrate SUB1 comprises a plurality of gate lines G (G1 to Gn) extending in a first direction X, and a plurality of signal lines S (S1 to Sm) intersecting with the gate lines G extending in the first direction X. The signal lines S extend in a second direction Y.

The gate lines G (G1 to Gn) extend to the outside of the display area DA and are connected to a gate line drive circuit (first drive circuit) GD. The signal lines S (S1 to Sm) extend to the outside of the display area DA and are connected to a source line drive circuit (second drive circuit) SD. For example, the first drive circuit GD and the second drive circuit SD are at least partially provided on the first substrate SUB1, and are connected to a control device (which may be referred to as a driving IC chip or a liquid crystal driver) CP. In the figure, the control device CP is mounted on the first substrate SUB1 outside the display area DA of the display panel PNL.

The second drive circuit SD comprises a multiplexer MPX in order to supply a pixel signal received from the control device CP to a corresponding subpixel via a signal line corresponding to the pixel signal. Thus, the multiplexer MPX outputs the received pixel signal to an appropriate signal line.

The control device CP comprises a built-in clock-and-timing-pulse generation circuit (which may be referred to as a controller or a sequencer) in order to control the first drive circuit GD, the second drive circuit SD, etc. The clock-and-timing-pulse generation circuit generates, for example, a timing pulse necessary for synchronously operating the display panel PNL as a whole. The timing pulse generation circuit is included in, for example, a drive circuit 120.

The control device CP includes a signal supply circuit 110. The signal supply circuit 110 is capable of internally synchronizing image data received from outside and providing the second drive circuit SD with the output image data. The signal supply circuit 110 is controlled by, for example, a mode control circuit 1211 included in the drive circuit 120, and is capable of switching the operation mode in accordance with the type of image data. Specifically, for example, the image data as the types may be the image data of red (R), green (G) and blue (B), the image data of red (R), green (G), blue (B) and white (W), the image data of red (R), green (G), blue (B) and dummy (DUM), or merely the image data of 1 bit. The signal supply circuit 110 may apply gamma correction to the received image data depending on the need.

A common electrode CE is formed of a transparent material on the second substrate SUB2 and corresponds to the entire display area DA. For example, the common electrode CE is formed in common with a plurality of subpixels PX. The common electrode CE electrically extends to the outside of the display area DA and is connected to the power feeding portion provided inside the control device CP. The power feeding portion applies constant common voltage (which may be referred to as a common signal) VCOM to the common electrode CE. The common electrode CE may produce an electric field for driving the liquid crystal layer between the common electrode CE and each pixel electrode PE.

Color filters are arranged in a plurality of subpixels PX in accordance with predetermined regulations. The color filters face the pixel electrodes with the liquid crystal layer LQ interposed and are formed on the second substrate SUB2.

The control device CP is further explained. The control device CP comprises the drive circuit 120. The drive circuit 120 comprises, for example, the mode control circuit 1211 which controls the display mode of the display panel PNL, a storage control circuit 1212 which stores data in the memory of each subpixel PX, and a display control circuit 1213 which provides a display element with a display signal or a non-display signal used by the display element to obtain display based on the data stored in the memory. The operation of the drive circuit 120 is explained in detail later.

The control device CP includes a central processing unit (CPU) 130. The CPU 130 controls the operation of the display device by receiving an operation signal for power-on or -off, an operation signal from an operation button (including a display button in a display portion), a data input signal from an external device, etc. In this case, the operation sequence of the display device is set based on the software program stored in a memory (not shown).

Figure 2A:
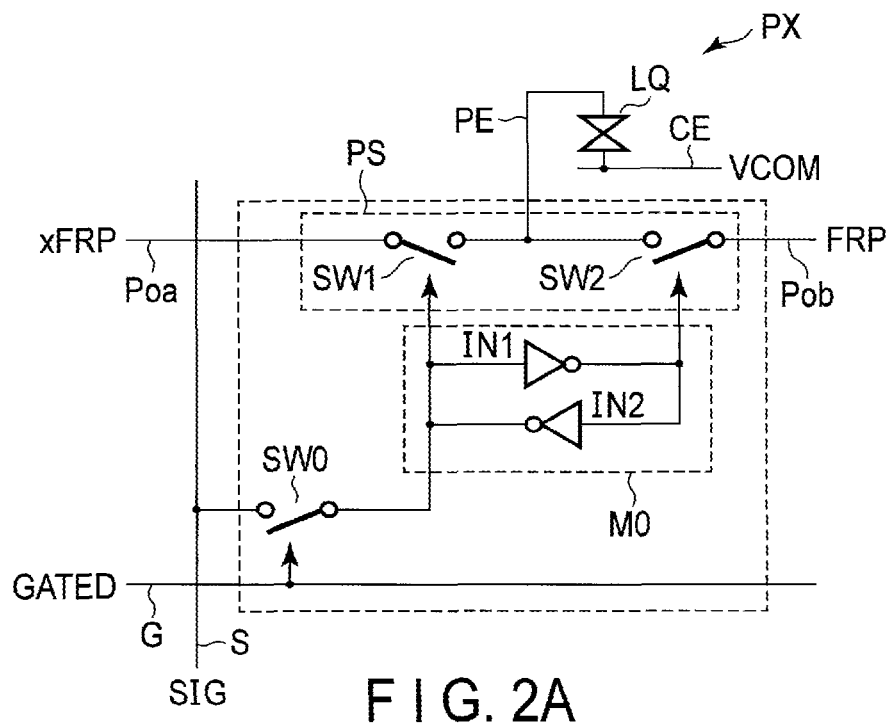
FIG. 2A is a circuit diagram showing the basic structure of a pixel comprising a memory.

FIG. 2A shows the structure of each subpixel PX (which may be referred to as a pixel or a pixel circuit) comprising a memory. In the subpixel PX, an end of switch SW0 is connected to the signal line S. The other end of switch SW0 is connected to memory M0. Memory M0 comprises, for example, inverters IN1 and IN2. Inverters IN1 and IN2 are connected in parallel in opposite directions. The input terminal of inverter IN1 (the output terminal of inverter IN2) is connected to the control terminal of switch SW1. The output terminal of inverter IN1 (the input terminal of inverter IN2) is connected to the control terminal of switch SW2. The input terminal of switch SW1 is connected to a first signal line Poa (first drive line). The output terminal of switch SW1 is connected to the pixel electrode PE of the display element formed in the liquid crystal layer. The input terminal of switch SW2 is connected to a second signal line Pob (first drive line). The output terminal of switch SW2 is connected to the pixel electrode PE. A first signal (basically display signal) xFRP is supplied to the first signal line Poa. A second signal (basically non-display signal) FRP is input to the second signal line Pob. The first signal xFRP and the second signal FRP are AC signals having the relationship of antiphase, and are generated by the control device CP explained with reference to FIG. 1. A common signal VCOM is supplied from the control device CP to the common electrode CE facing the pixel electrode PE. The common signal VCOM is an AC signal having the same phase as the second signal FRP. The circuit comprising switches SW1 and SW2 may be referred to as a pixel potential select circuit PS. The pixel potential select circuit PS is capable of selecting signal xFRP or signal FRP based on the storage data of memory M0.

Figure 2B:
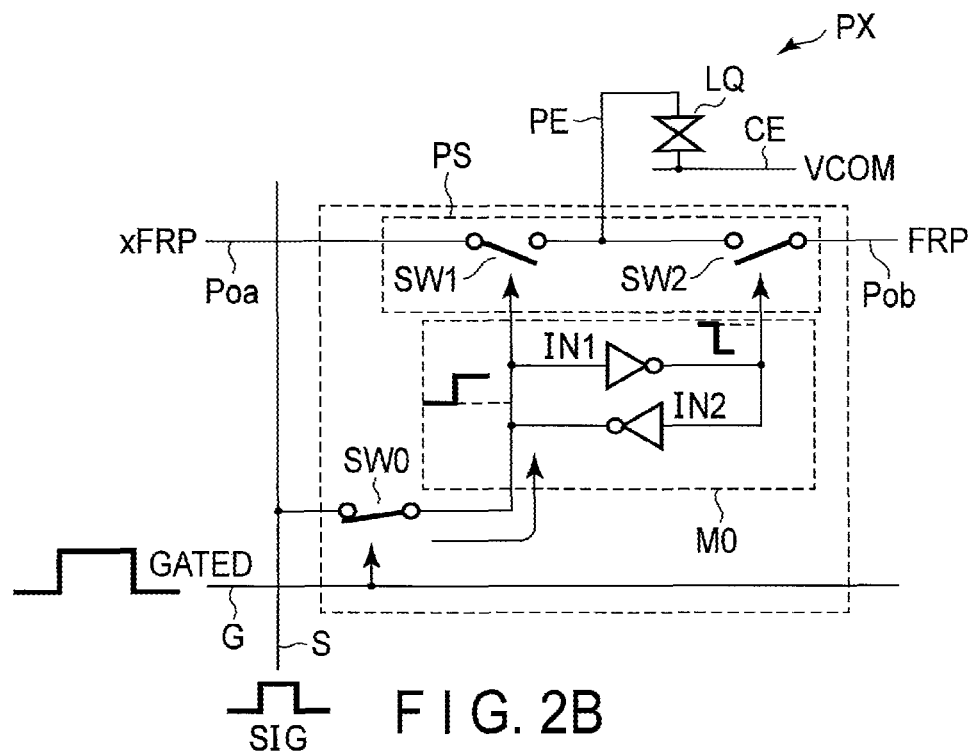
FIG. 2B shows an example of an operation which is performed when data is written to a memory in a pixel comprising the memory.

FIG. 2B shows an operation example when data 1 is written to memory M0 of the above subpixel PX. When a gate pulse GATED is supplied to the gate line G, switch SW0 is on (closed). When a signal SIG (data 1) is output to the signal line S, data 1 (high) is written to and stored in memory M0. At this time, inverter IN1 inverts the input, and thus, the output of inverter IN1 is 0 (low). Since the input of inverter IN2 is low, the output of inverter IN2 is high. When switch SW0 is off, data 1 is stored in memory M0.

Figure 3:
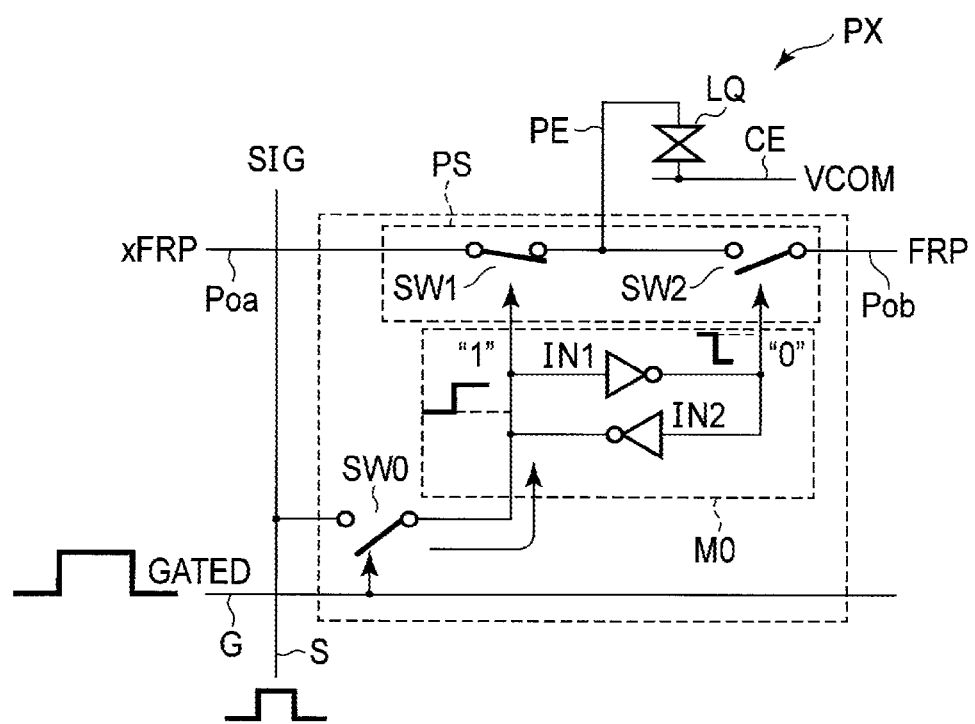
FIG. 3 shows an example of the state in a period (display period) in which data is stored in a pixel comprising a memory.

As shown in FIG. 3, when switch SW0 is off (opened), and data 1 is stored in memory M0, switch SW1 is on (closed) by the output of memory M0, and switch SW2 is off (opened). As a result, the first signal xFRP is supplied to the pixel electrode PE of the display element (liquid crystal layer) LQ. The common signal VCOM is supplied to the common electrode CE.

Figure 4:
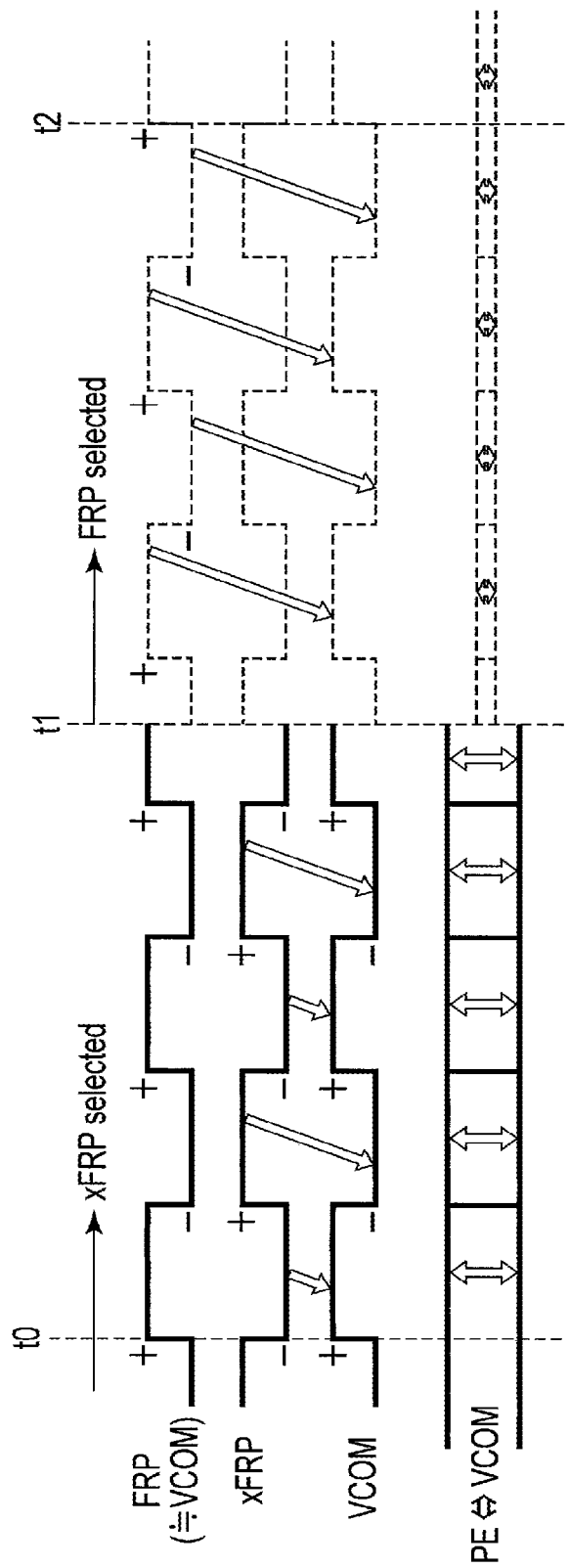
FIG. 4 shows examples of waveforms and storage data for explaining an example of an operation in a period (display period) in which data is stored in a pixel comprising a memory.

FIG. 4 shows the change of the difference in potential between the pixel electrode PE and the common electrode CE in the above subpixel PX. FIG. 4 shows that, from time t0 to time t1, the first signal xFRP is supplied to the pixel electrode PE, and the common signal VCOM is supplied to the common electrode CE. Since the relationship of antiphase is established between the first signal xFRP and the common signal VCOM, the difference in potential between the pixel electrode PE and the common electrode CE is large. At this time, the display element forms a display state.

It is assumed that data 0 is stored in memory M0. In this case, switch SW1 is off, and switch SW2 is on. Thus, as shown in FIG. 4, from time t1 to time t2, the second signal FRP is supplied to the pixel electrode PE, and the common signal VCOM is supplied to the common electrode CE. Since the second signal FRP and the common signal VCOM has the same phase, the difference in potential between the pixel electrode PE and the common electrode CE is small, or there is no difference in potential between them. At this time, the display element forms a non-display state.

FIG. 5 shows the circuit structure of the subpixel shown in FIG. 2A, FIG. 2B and FIG. 3 in more detail. Switch SW0 is structured by, for example, thin-film transistor Q0. Memory M0 is structured by thin-film transistors Q1, Q2, Q3 and Q4. Switch SW1 included in the pixel potential select circuit PS is structured by thin-film transistors Q5 and Q6. Switch SW2 included in the pixel potential select circuit PS is structured by thin-film transistors Q7 and Q8. When data 1 is written to memory M0, thin-film transistors Q1 and Q4 are on, and thin-film transistors Q2 and Q3 are off. By the output of memory M0, thin-film transistors Q5 and Q6 are on, and thin-film transistors Q7 and Q8 are off. When data 0 is written to memory M0, thin-film transistors Q2 and Q3 are off, and thin-film transistors Q1 and Q4 are off. By the output of memory M0, thin-film transistors Q5 and Q6 are off, and thin-film transistors Q7 and Q8 are on.

Figure 6A:
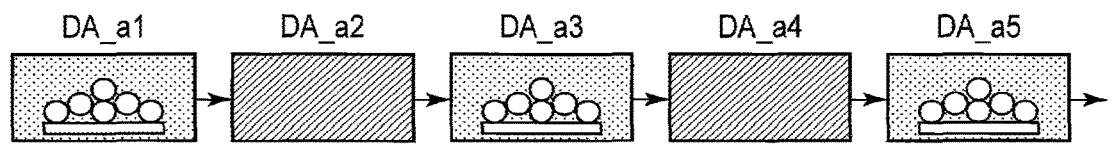
FIG. 6A shows an example when a particular display is performed in a display panel according to the embodiment.

FIG. 6A shows an example when a particular display is performed in the display area DA of the display panel PNL according to one embodiment. The display state of the display area DA changes over time from display DA_a1 to display DA_a2, DA_a3, DA_a4, DA_a5, . . . . Displays DA_a1, DA_a3, DA_a5, . . . show, for example, the image of an item of merchandise on a shelf at a store. For example, black display (particular display) is applied to the whole area of displays DA_a2, DA_a4, . . . between the images of the merchandise. When the display state is switched from normal image display to black display on the whole screen, the eye-catching effect or highlighting effect of the display device can be enhanced. In this manner, it is possible to attract the attention of customers to the merchandise on the display shelf at the store.

Figure 6B:
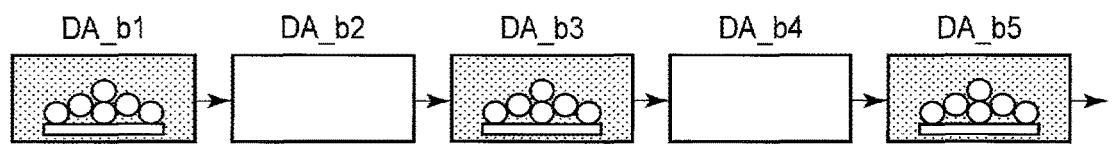
FIG. 6B shows another example when a particular display is performed in the display panel according to the embodiment.

FIG. 6B shows another example when a particular display is performed in the display area DA of the display panel PNL according to the embodiment. The display state of the display area DA changes over time from display DA_b1 to display DA_b2, DA_b3, DA_b4, DA_b5, . . . . Displays DA_b1, DA_b3, DA_b5, . . . show, for example, the image of an item of merchandise on a shelf at a store. For example, white display (particular display) is applied to the whole area of displays DA_b2, DA_b4, . . . between the images of the merchandise. Effects similar to those of the above example can be obtained from this display.

Figure 6C:
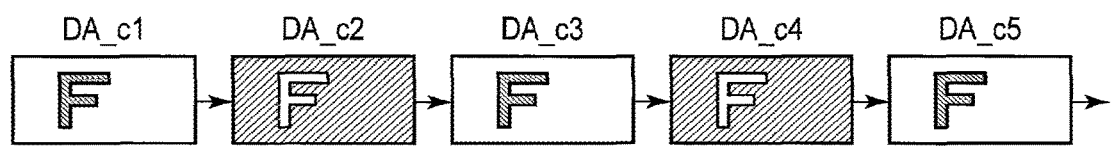
FIG. 6C shows another example when a particular display is performed in the display panel according to the embodiment.

FIG. 6C shows another example when a particular display is performed in the display area DA of the display panel PNL according to the embodiment. The display state of the display area DA changes over time from display DA_c1 to display DA_c2, DA_c3, DA_c4, DA_c5, . . . . Normal display is applied to displays DA_c1, DA_c3, DA_c5, . . . . Color inversion is applied to displays DA_c2, DA_c4, . . . , between the normal displays. Effects similar to those of the above examples can be obtained from this display.

As stated above, in the present embodiment, each display element is a liquid crystal display element LQ, and the display area DA is changed from a first display state, which is a normal state for displaying an image in the dot-matrix of pixels, to a second display state, which is a particular display state. At this time, the display state may be switched to a particular display state such as a second mode or a third mode. In the second mode, the light-shielding potential of a plurality of display elements LQ is applied to the first and second drive lines. In the third mode, the phototransmissive potential of a plurality of display elements LQ is applied to the first and second drive lines. In this case, the mode control circuit 1211 switches the first mode to the second mode or the third mode by changing the voltage waveform of a display signal or a non-display signal supplied to the pixel electrode PE of a display element relative to the voltage waveform (specifically, the continuous voltage pattern as shown in FIG. 4) of the signal supplied to the common electrode of the display element. The second display state set by the mode control circuit 1211 may obtain a second display state corresponding to the inverted data prepared by inverting the output data of memory M0.

FIG. 7 shows a circuit example for realizing the displays shown in FIG. 6A to FIG. 6C. The above particular displays are realized by the characteristic operations of the drive circuit 120. The drive circuit 120 operates based on an instruction from the CPU 130. The CPU 130 is capable of controlling the start and end of a particular operation of the drive circuit 120 based on an instruction transmitted to a reception module 10 from outside wirelessly or via wireless communication, or an instruction from a timer (counter) 131.

When an instruction for writing data to subpixels is issued from the CPU 130, the storage control circuit 1212 is activated, and data is written to subpixels. The storage control circuit 1212 controls the gate line drive circuit and the signal line drive ciruict, and writes data to the memory of each subpixel.

When a mode-specifying signal is input from the CPU 130 to the mode control circuit 1211 in an image display state, the mode control circuit 1211 controls the display control circuit 1213. The mode control circuit 1211 supplies a switch control signal to a switch control circuit SW_cont provided in the display control circuit 1213.

The display control circuit 1213 comprises switches SWa, SWb, SWc and SWd. Alternating common electrode drive signals are input to switches SWa, SWb, SWc and SWd. The common electrode drive signals include signals (referred to as common electrode first drive signals) produced by inverting AC signals from a common electrode control circuit 1215 in an inverter 1216, and signals (referred to as common electrode second drive signals) produced by further inverting the inverted signals in an inverter 1217.

The common electrode first drive signals are supplied to the input terminals of switches SWb and SWd. The common electrode second drive signals are supplied to the input terminals of switches SWa and SWc.

The output terminals of switches SWa and SWb are connected to the first signal line Poa in common. Its output signal is used as the first signal (a display signal or a non-display signal) xFRP. The output terminals of switches SWc and SWd are connected to the second signal line Pob in common. Its output signal is used as the second signal (a non-display signal or a display signal) FRP.

As described above, the mode control circuit 1211 is capable of setting the duration and/or repetition frequency of the second display state based on the internal counter and/or a control signal from outside.

Figures 8, 10:
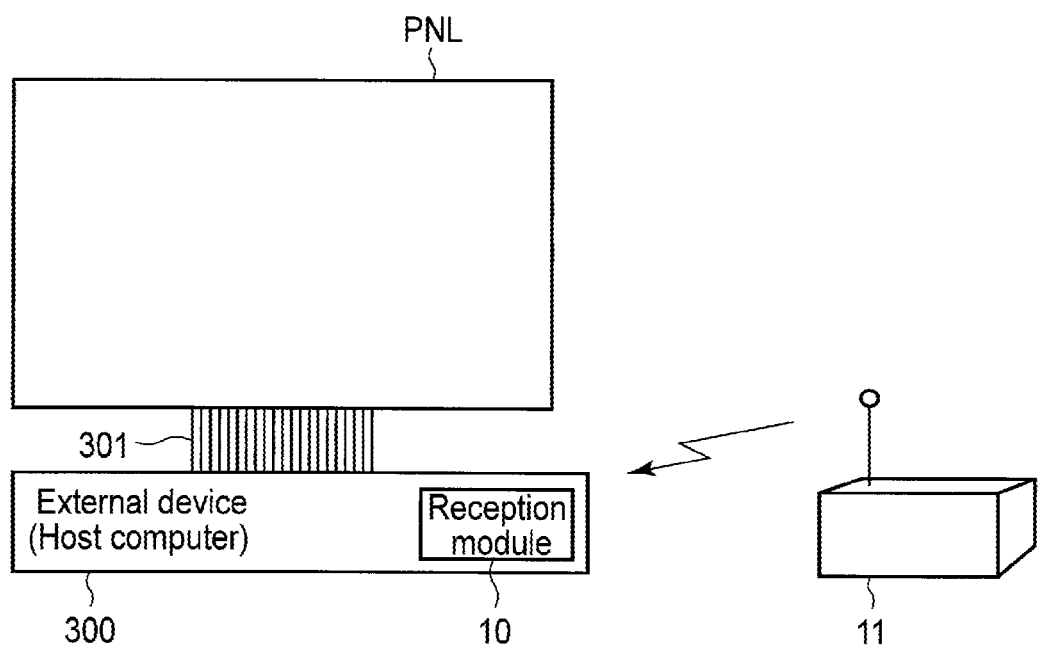
FIG. 8 is an explanatory diagram showing the operation form of switches of the circuit shown in FIG. 7.
FIG. 10 is shown for explaining a structural example for externally controlling the drive circuit according to the embodiment.

FIG. 8 shows examples of control states of switches SWa, SWb, SWc and SWd of the drive circuit 120. When the display device is in the first display state, switches SWa, SWb, SWc and SWd are off, on, on and off, respectively. At this time, signal xFRP supplied to the first drive line is an AC signal which changes in a polarity direction (in other words, a phase or a potential direction) opposite to the common signal VCOM. Signal FRP supplied to the second drive line is an AC signal which changes in the same polarity direction (in other words, the same phase or the same potential direction) as the common signal VCOM.

When displays DA_a2 and DA_a4 shown in FIG. 6A are obtained, switches SWa, SWb, SWc and SWd are on, off, on and off, respectively. At this time, both signal xFRP supplied to the first drive line and signal FRP supplied to the second drive line are AC signals which change in the same polarity direction (in other words, the same phase or the same potential direction) as the common signal VCOM. Thus, no display potential is applied to the display elements regardless of the data of the memories. In this way, the entire display area DA is changed to black display at once.

When displays DA_b2 and DA_b4 shown in FIG. 6B are obtained, switches SWa, SWb, SWc and SWd are off, on, off and on, respectively. At this time, both signal xFRP supplied to the first drive line and signal FRP supplied to the second drive line are AC signals which change in a polarity direction (in other words, a phase or a potential direction) opposite to the common signal VCOM. Thus, display potential is applied to the display elements regardless of the data of the memories. In this way, the entire display area DA is changed to white display at once.

When displays DA_c2 and DA_c4 shown in FIG. 6C are obtained, switches SWa, SWb, SWc and SWd are on, off, off and on, respectively. At this time, both signal xFRP supplied to the first drive line and signal FRP supplied to the second drive line in the first display state are inverted and output. Thus, black and white inverted display is applied to the display state.

Figure 9:
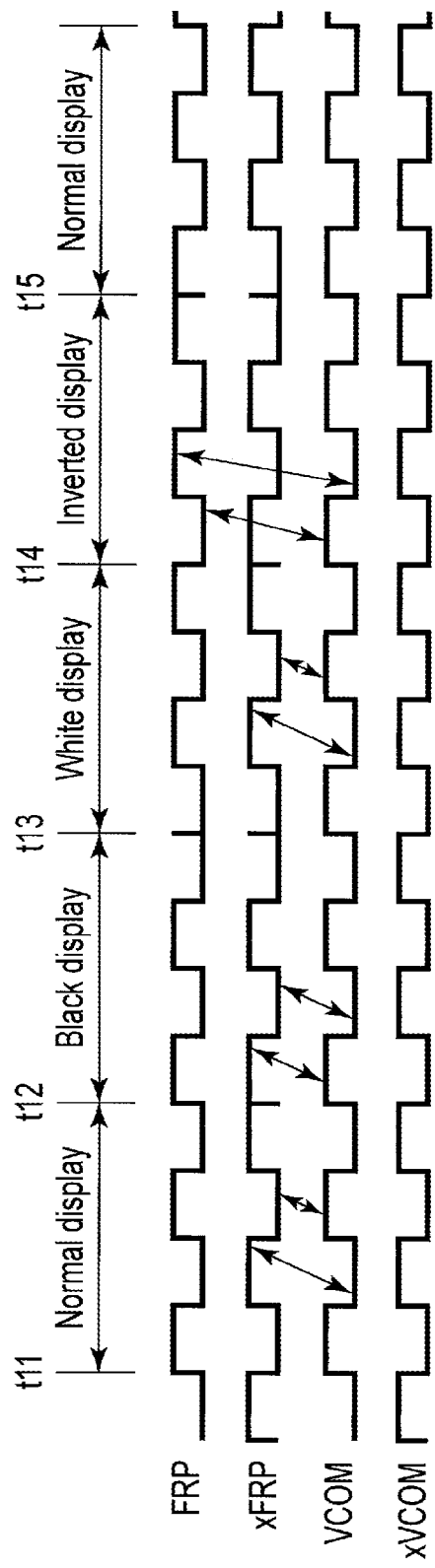
FIG. 9 shows examples of waveforms of signals FRP, xFRP, VCOM and xVCOM for obtaining the displays shown in FIG. 6A, FIG. 6B and FIG. 6C.

FIG. 9 shows a period from t11 to t12 in which the picture is displayed in black and white (normal display), a period from t12 to t13 in which black display is applied to the whole screen, a period from t13 to t14 in which white display is applied to the whole screen, and an inverted display period from t14 to t15. In each period, the states of switches SWa to SWd in the display control circuit 1213 are controlled as shown in the table of FIG. 8. By this control, the polarity change of signals FRP and xFRP is switched.

In the normal display period from t11 to t12, specifically, while the picture is displayed in black and white, display voltage based on the memory output is applied to the pixel electrode of each subpixel. In the black display period from t12 to t13, the polarity change of signal xFRP is set such that the difference between the voltage of signal xFRP and the voltage of the common signal VCOM is the minimum relative to the whole screen. In the next white display period from t13 to t14, the polarity change of signal xFRP is set such that the difference between the voltage of signal xFRP and the voltage of the common signal VCOM is the maximum relative to the whole screen. In the next black and white inversion period, specifically, while the picture is displayed with the inversion of black and white, antiphase is applied to the polarity change of voltage of signals xFRP and FRP in comparison with the normal display period. The phase (potential change) of common signals VCOM and xVCOM is not changed.

In the above description, this specification shows a case where pictures are displayed in black and white, referring to FIG. 9. However, single-color display or inverted display can be realized in color display devices in a manner similar to that of black and white display devices as explained later.

FIG. 10 shows that an external device (host computer) 300 is connected to the control device CP of the display panel PNL via a flexible substrate 301. The external device 300 comprises the reception module 10 shown in FIG. 7, and is capable of receiving, for example, an operation signal transmitted from a remote controller 11 via wireless communication. The operation signal is, for example, a signal for determining how often the particular displays shown in FIG. 6A to FIG. 6C are applied and/or the frequency of these displays, a signal for immediately performing a particular display, or a selection signal for determining which particular display should be performed from the particular displays shown in FIG. 6A to FIG. 6C. To automatically perform a particular display, information to instruct how often it should be performed may be set in the timer 131 (see FIG. 7) by an operation signal from the remote controller 11.

FIG. 11 shows another embodiment. Thus, the present invention is not limited to the above embodiment. Various modifications may be applied to the present invention. Structural elements equivalent to those shown in FIG. 7 are denoted by like reference numbers, and detailed description thereof is omitted. In the present embodiment, a plurality of display control circuits 1213a to 1213d having the same structure are provided. Each of display control circuits 1213a to 1213d is capable of outputting the first signal (a display signal or a non-display signal) xFRP and the second signal (a non-display signal or a display signal) FRP on its own.

The display area of the display panel PNL is divided into a plurality of (for example, four) display areas DA1, DA2, DA3 and DA4. The divided areas can be separately driven for display. Thus, a part of the display area can be changed to the second display state. For example, display area DA1 can be changed to the second display state by display control circuit 1213a, and display areas DA2, DA3 and DA4 can be changed to the first display state by display control circuits 1213b to 1213d. As an applied example, in a period, display area DA2 can be in the second display state using display control circuit 1213b, and display areas DA1, DA3 and DA4 can be in the first display state using display control circuits 1213a, 1213c and 1213d. In another period, display area DA3 can be in the second display state using display control circuit 1213c, and display areas DA1, DA2 and DA4 can be in the first display state using display control circuits 1213a, 1213b and 1213d.

FIG. 12A and FIG. 12B show examples in which the image display is controlled by the embodiment shown in FIG. 11. In FIG. 12A, the display state of the display area DA is changed from display DA_d1 to display DA_d5. Each display includes the second display state in a part of the area. In displays DA_d1 to DA_d5, for example, black display is realized in display areas DA1, DA2, DA3, DA4 and DA1, respectively, as particular display areas.

In FIG. 12B, each of displays DA_e1 to DA_e5 includes the second display state in a part of the area, and white display is realized as particular display in each of displays DA_e1 to DA_e5. Thus, white display is realized in display areas DA1, DA2, DA3, DA4 and DA1.

When a particular display is performed as described above, the eye-catching effect or highlighting effect of the display device can be enhanced. It is possible to attract the attention of customers to the merchandise displayed on shelves at stores.

As explained above, the display device comprises a digital signal line S to which a digital signal based on image data is supplied, and memory M0 which stores the digital signal and is provided in a pixel. In the first display state, the first drive line Poa is selected in accordance with the digital signal stored in the memory, and supplies the first signal. Further, the second drive line Pob is selected in accordance with the digital signal stored in the memory, and supplies the second signal FRP.

For example, in FIG. 5, the pixel potential select circuit PS is electrically connected to the pixel electrode. The pixel potential select circuit PS selectively supplies the first signal or the second signal to the pixel electrode. The common electrode faces the pixel electrode. A common signal is supplied to the common electrode. The common electrode produces an electric field for driving the liquid crystal layer between the common electrode and the pixel electrode. In the display device, the mode control circuit sets a storage period for storing the digital signal in the memory, and a display period in which the gate circuit selectively supplies the first signal or the second signal to the pixel electrode in accordance with the digital signal stored in the memory. The mode control circuit switches the voltage waveform of the first or second signal to another voltage waveform and sets the second display state in the display period.

Figure 13:
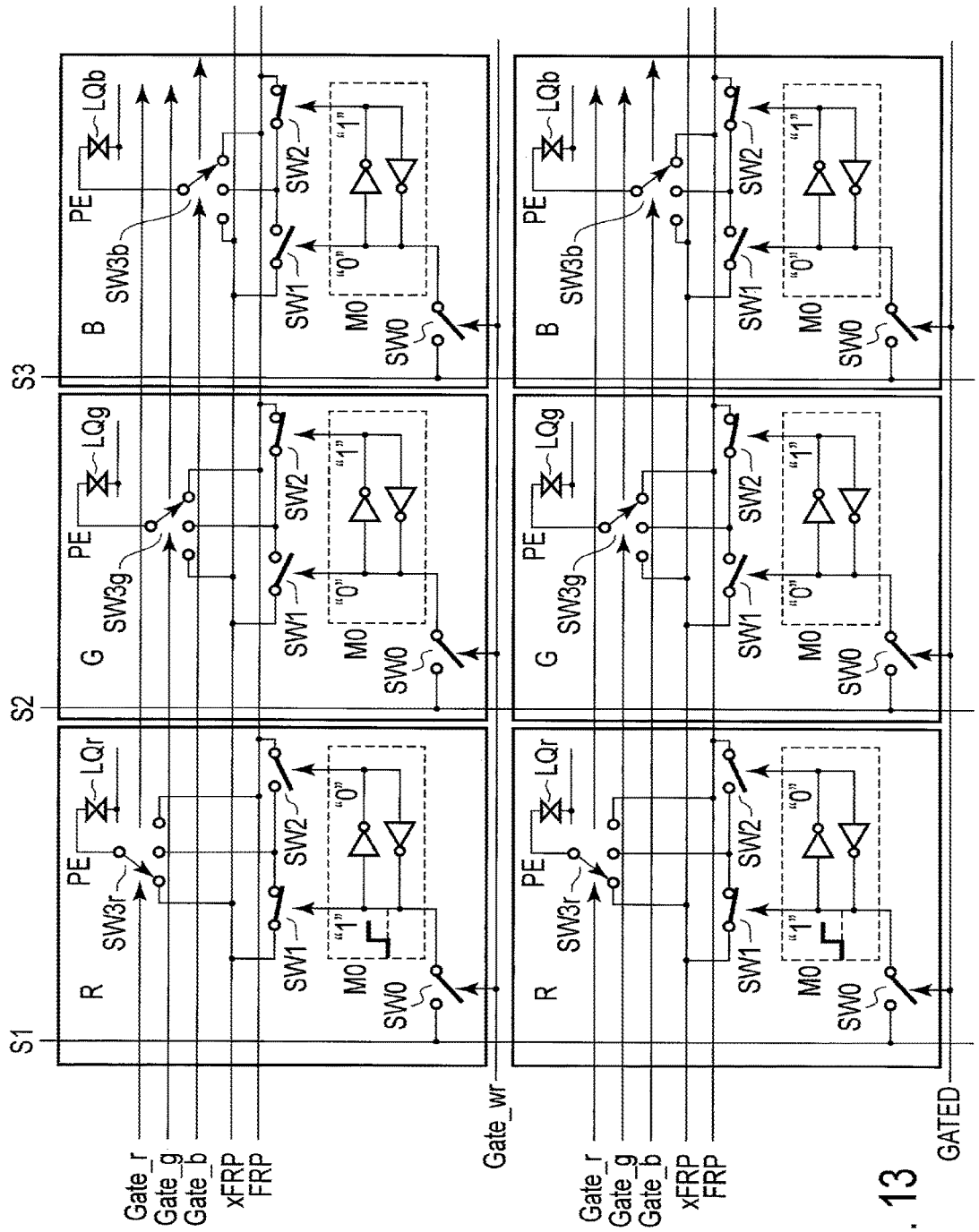
FIG. 13 is a circuit diagram showing other basic structures of pixels each comprising a memory.

FIG. 13 shows another embodiment. In this embodiment, the display device comprises color subpixels. The color subpixels denoted by R, G and B are color subpixels comprising red, green and blue filters, respectively. The basic structures of the subpixels are the same. The subpixels comprise different color filters. In color subpixel R, data for red is written to memory M0 from signal line S1 via switch SW0. The operation for writing data to memory M0, and the display operation which is performed after the write operation are explained above with reference to FIG. 2A, FIG. 2B and FIG. 3. When a signal is supplied from memory M0 of color subpixel R to the pixel electrode PE of color subpixel R, the signal is supplied via switch SW3r. When a signal is supplied from memory M0 of color subpixel G to the pixel electrode PE of color subpixel G, the signal is supplied via switch SW3g. When a signal is supplied from memory M0 of color subpixel B to the pixel electrode PE of color subpixel B, the signal is supplied via switch SW3b. Switches SW3r, SW3g and SW3b are controlled by control gate signals Gate_r, Gate_g and Gate_b, respectively. Switches SW3r, SW3g and SW3b are capable of selecting a corresponding memory output, and the first signal xFRP or the second signal FRP, by control gate signals Gate_r, Gate_g and Gate_b, respectively.

It is assumed that the above display device is in a color image display state. Switches SW3r, SW3g and SW3b shown in FIG. 13 select signal xFRP or FRP in accordance with the data stored in a corresponding memory. Each color subpixel is changed to a display state or a non-display state in accordance with the output data from a corresponding memory, and realizes color display as the whole area. It is assumed that the image of the display area is in the first display state, and a color image is displayed. For example, to display a single-color image in the display area (for example, to apply red to the whole region), as shown in FIG. 13, the selection states of switches SW3g and SW3b of color subpixels G and B should be concurrently switched to the FRP side, and switches SW3r of color subpixels R should be concurrently switched to the xFRP side. Cyan and magenta may be concurrently displayed in accordance with the combination of R, G and B to change the state to a display state.

FIG. 14A shows a display example in which a particular display is performed in the display device using the pixels shown in FIG. 13. This display example shows displays DA_a1, DA_a3 and DA_a5 in which a color image is displayed, and displays DA_a2 and DA_a4 in which the state has been changed to a particular display (in this case, for example, such that red is applied to the screen as the single color at once).

FIG. 14B shows another display example in which a particular display is performed. This display example shows displays DA_b1, DA_b3 and DA_b5 in which a color image is displayed, and displays DA_b2 and DA_b4 in which the state has been changed to a particular display (in this case, for example, such that green is applied to the screen as the single color at once).

FIG. 14C shows another display example in which a particular display is performed. This display example shows displays DA_c1, DA_c3 and DA_c5 in which a color image is displayed, and displays DA_c2 and DA_c4 in which the state has been changed to a particular display (in this case, for example, such that blue is applied to the screen as the single color at once).

As stated above, the drive circuit 120 includes the mode control circuit 1211, and the drive circuit 120 is capable of changing the entire display area of the display device to the second display state. The drive circuit 120 is also capable of changing a part of the display area of the display device to the second display state. Further, the display device may comprise display control circuits capable of independently outputting signals FRP and xFRP as shown in FIG. 11. In this manner, the mode control circuit 1211 may change a part of the display area of the display device to the second display state and further shift the part of the display area to a different area, or may change a part of the display area to single-color display. A plurality of display elements correspond to red, green and blue filters. The second display state includes the single-color display states of red, green, blue, black and white.

In the display device, each pixel circuit comprises a digital signal line S to which a digital signal based on image data is supplied, memory M0 which stores the digital signal and is provided in a pixel, the first drive line Poa which is selected in accordance with the digital signal stored in memory M0 and supplies the first signal xFRP, and the second drive line Pob which is selected in accordance with the digital signal stored in memory M0 and supplies the second signal FRP. The pixel circuit is electrically connected to the pixel electrode PE. The pixel circuit comprises the gate circuit GS which selectively supplies the first or second signal to the pixel electrode, and the common electrode CE which faces the pixel electrode, is supplied with a common signal and produces an electric field for driving the liquid crystal layer between the common electrode and the pixel electrode.

The display control circuit 1213 sets a storage period for storing a digital signal in memory M0, and a display period in which the gate circuit selectively supplies the first signal or the second signal to the pixel electrode in accordance with the digital signal stored in memory M0. The display device changes the image of the display area for displaying the image data in the display period. Specifically, for example, the voltage waveform of the first or second signal may be switched to another waveform to set the second display state in the display period.

In the first mode of the display device, the potential of the first signal is phototransmissive potential, and the potential of the second signal is light-shielding potential. In the second mode (white inversion mode), the potential of the first and second signals is phototransmissive potential. The drive circuit having the mode control circuit switches the first mode to the second mode in the display period. By switching the first mode to the second mode, it is possible to perform blinking display using white images.

The display device comprises the first mode and the third mode (for example, a black inverted display mode). In the first mode, the potential of the first signal is phototransmissive potential, and the potential of the second signal is light-shielding potential. In the third mode, the potential of the first and second signals is light-shielding potential. The drive circuit 120 having the mode control circuit 1211 is capable of switching the first mode to the third mode in the display period. By switching the first mode to the third mode, it is possible to perform blinking display using black images. Thus, it is possible to realize blinking display using white and black images by switching the applied mode among the first mode, the second mode and the third mode.

The display device comprises the first mode and the second mode. In the first mode, the first signal is a signal different from the common signal, and the second signal is the same signal as the common signal. In the second mode (white inversion), the first and second signals are signals different from the common signal, and the drive circuit 120 having the mode control circuit 1211 is capable of switching the first mode to the second mode in the display period.

The display device comprises the first mode and the third mode. In the first mode, the first signal is a signal different from the common signal, and the second signal is the same signal as the common signal. In the third mode (black inversion), the first and second signals are the same signals as the common signal, and the drive circuit 120 is capable of switching the first mode to the third mode in the display period.

The display device comprises the first mode and a fourth mode (a switching state between negative and positive displays). The first signal in the first mode is the same signal as the second signal in the fourth mode. The first signal in the fourth mode is the same signal as the second signal in the first mode. The mode control circuit is capable of switching the first mode to the fourth mode in the display period.

Figure 15:
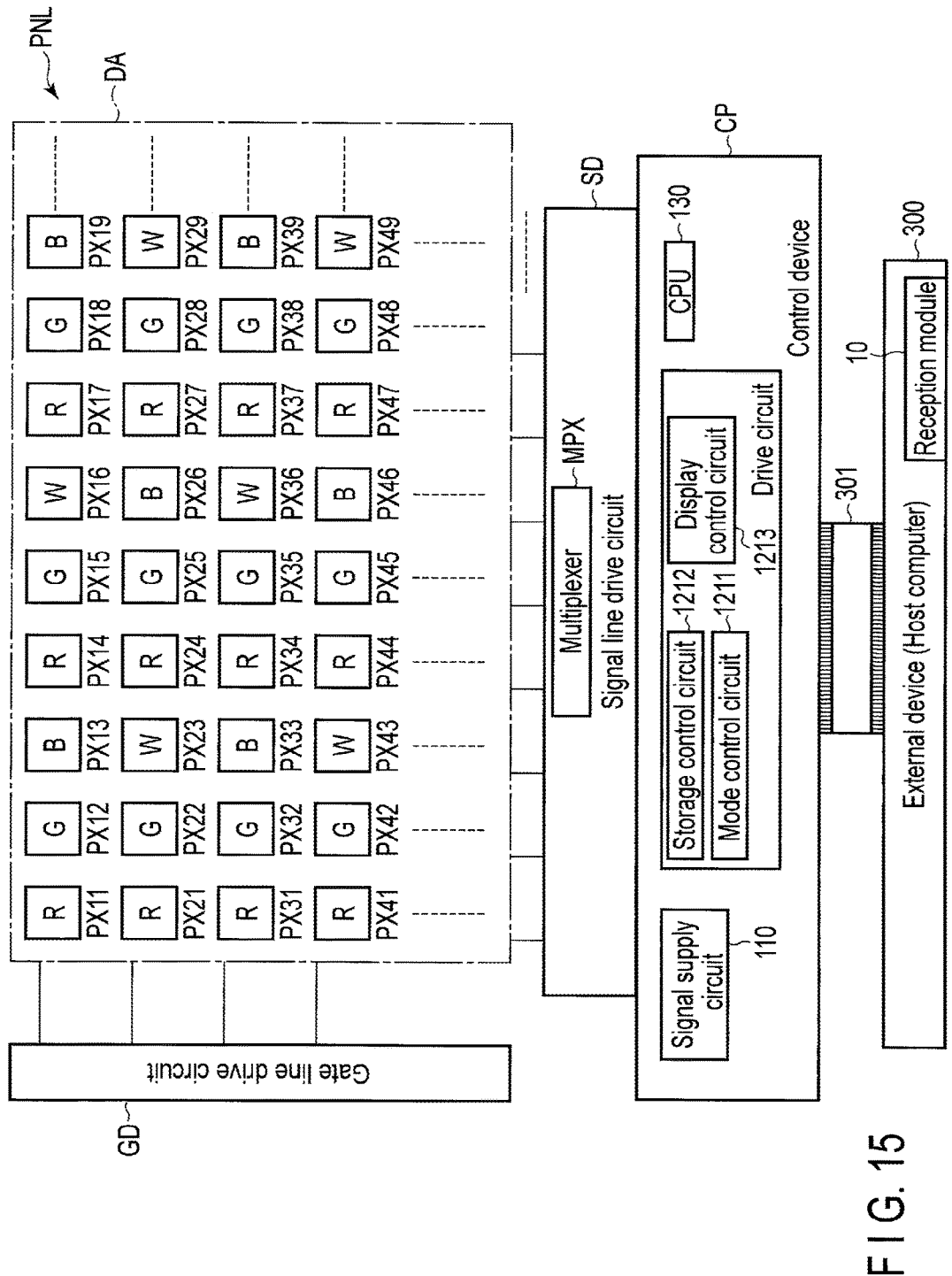
FIG. 15 shows another embodiment.

FIG. 15 shows a modification example of the color display device shown in FIG. 13. The embodiment of FIG. 15 is different from that of FIG. 13 in terms of the types and arrangement of color filters. The other portions are substantially the same as those of the embodiment shown in FIG. 13. In the embodiment of FIG. 15, when the first row is viewed in the first direction, the color filters are arranged in the order of R, G, B, R, G, W, . . . . When the second row is viewed in the first direction, the color filters are arranged in the order of R, G, W, R, G, B, . . . . Thus, in the first column, the color filters are arranged in the order of R, R, R, R, . . . . In the second column, the color filters are arranged in the order of G, G, G, G, . . . . In the third column, the color filters are arranged in the order of B, W, B, W, . . . . In the fourth column, the color filters are arranged in the order of R, R, R, R, . . . . The present invention can be also applied to this type of display device.

As explained above, in the above color display device, for example, single-color display or inverted display can be realized in a manner similar to that of black-and-white display devices by controlling switches SWr, SWg and SWb.

Figure 16:
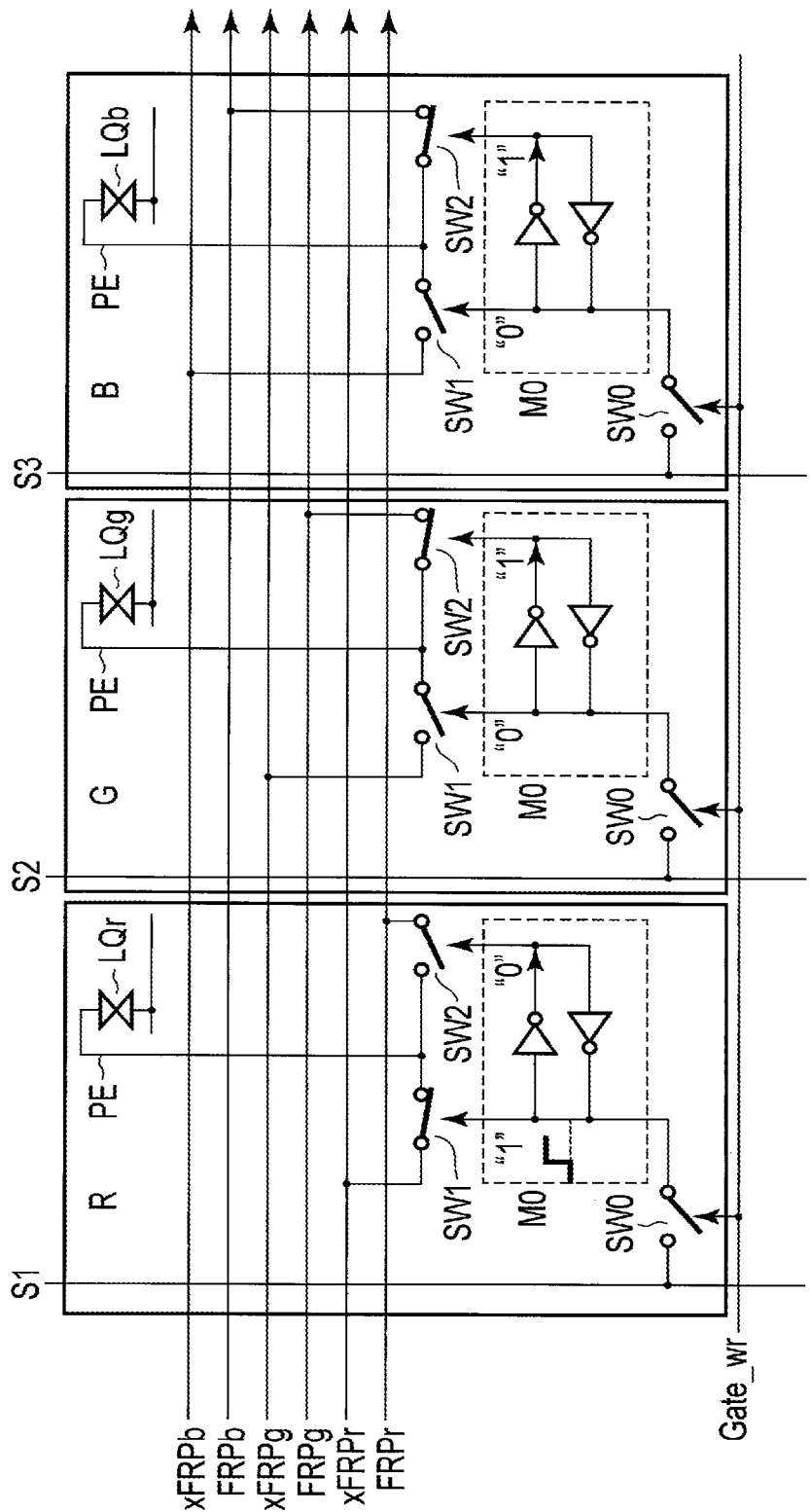
FIG. 16 is a circuit diagram showing other basic structures of pixels each comprising a memory.
Figure 17:
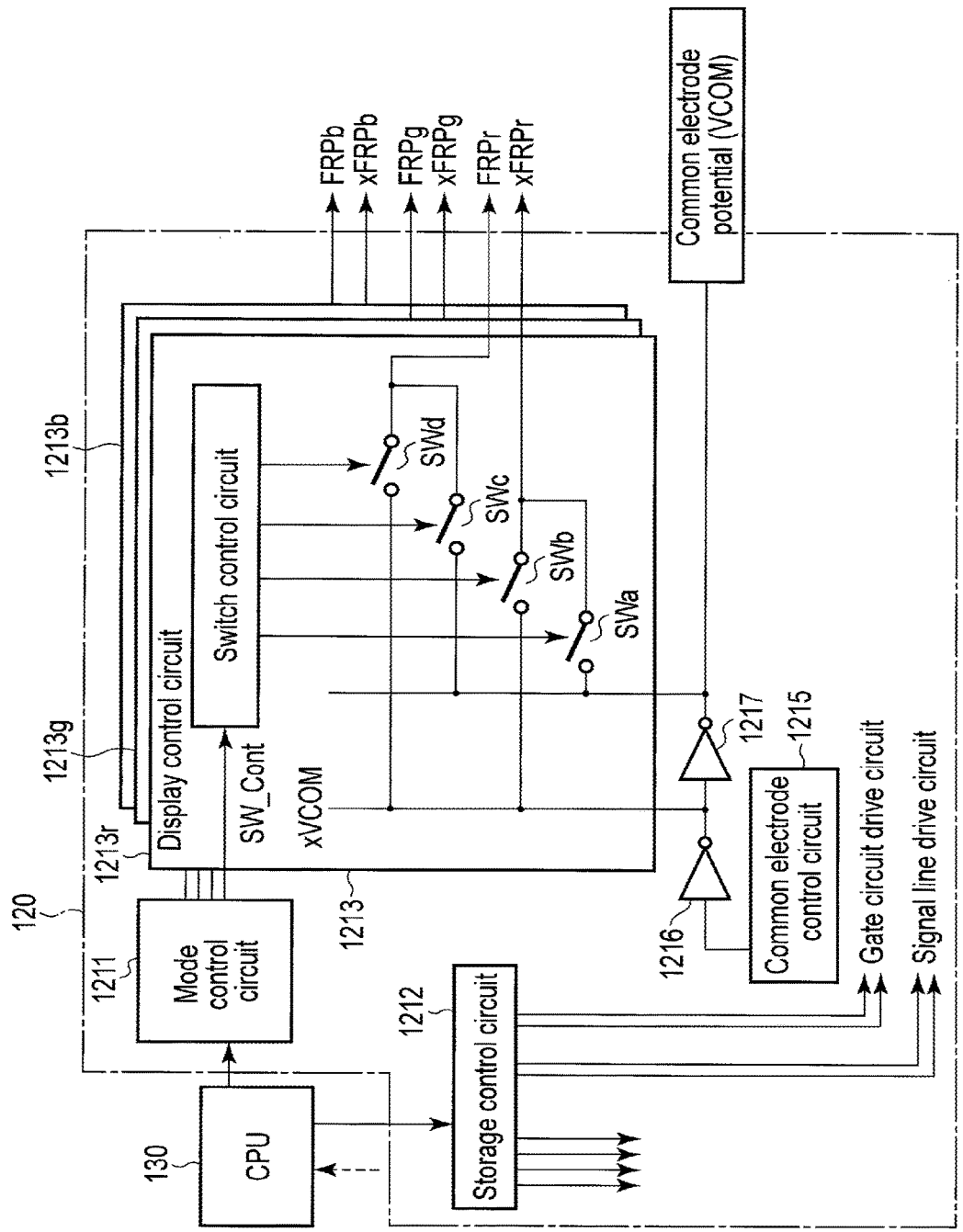
FIG. 17 is a circuit diagram showing an example of the specific structure of a drive circuit which drives the circuit shown in FIG. 16.

FIG. 16 and FIG. 17 show another embodiment. The embodiment structures a part of a color display device and a drive circuit 120. Structural elements equivalent to those of the embodiments shown in FIG. 13 and FIG. 7 are denoted by the same reference numbers. In FIG. 16, the circuit structures of a red subpixel, a green subpixel and a blue subpixel are shown out of the subpixels for one row. The embodiment of FIG. 13 has only one system, specifically, the system of signals xFRP and FRP in which a plurality of subpixels can be concurrently driven. However, the present embodiment has three systems, specifically, the system of signals xFRPr and FRPr in which only the red subpixels are concurrently driven, the system of signals xFRPg and FRPg in which only the green subpixels are concurrently driven, and the system of signals xFRPb and FRPb in which only the blue subpixels are concurrently driven.

In the present embodiment, each subpixel is driven in a manner similar to that of the drive circuit explained in FIG. 7. When the screen transitions from a normal display state to a display state in red as the single color, the voltage waveform of signals xFRPr and FRPr is output by the switch selection mode in the white display of the table of FIG. 8. At this time, the voltage waveform of signals xFRPg and FRPg and signals xFRPb and FRPb corresponding to the other subpixels, specifically, the green and blue subpixels, is output by the switch selection mode in the row of the black display of the table of FIG. 8. When the screen transitions from a normal display state to a display state in green as the single color, the voltage waveform of signals xFRPg and FRPg is output by the switch selection mode in the white display of the table of FIG. 8. At this time, the voltage waveform of signals xFRPr and FRPr and signals xFRPb and FRPb corresponding to the other subpixels, specifically, the red and blue subpixels, is output by the switch selection mode in the black display of FIG. 8. When the screen transitions from a normal display state to a display state in blue as the single color, the voltage waveform of signals xFRPb and FRPb is output by the switch selection mode in the white display of the table of FIG. 8. At this time, the voltage waveform of signals xFRPr and FRPr and signals xFRPg and FRPg corresponding to the other subpixels, specifically, the red and green subpixels, is output by the switch selection mode in the black display of FIG. 8.

In the present embodiment, all of the R, G and B subpixels are off (black display) when black display is applied to the whole screen. All of the R, G and B subpixels are on (white display) when white display is applied to the whole screen. In a similar manner, in the color display device of FIG. 13, all of the R, G and B subpixels are off (black display) when black display is applied to the whole screen. Further, all of the R, G and B subpixels are on (white display) when white display is applied to the whole screen.

FIG. 17 shows an example of the drive circuit for driving the color display device shown in FIG. 16. FIG. 17 is similar to the drive circuit 120 explained with reference to FIG. 7. The same blocks as those of FIG. 7 are denoted by the same reference numbers as those of FIG. 7, and the detailed description thereof is omitted. The present embodiment comprises a display control circuit 1213r for controlling the display state of the red subpixels, a display control circuit 1213g for controlling the display state of the green subpixels, and a display control circuit 1213b for controlling the display state of the blue subpixels. FIG. 17 shows the structure of display control circuit 1213r as the representative example. Display control circuits 1213r, 1213g and 1213b are capable of concurrently driving corresponding red, green and blue subpixels. Display control circuits 1213r, 1213g and 1213b output signals xFRPr and FRPr, signals xFRPg and FRPg, and signals xFRPb and FRPb, respectively. Signals xFRPr and FRPr, signals xFRPg and FRPg, and signals xFRPb and FRPb are drive signals for driving corresponding subpixels as shown in FIG. 16.

Figure 18A:
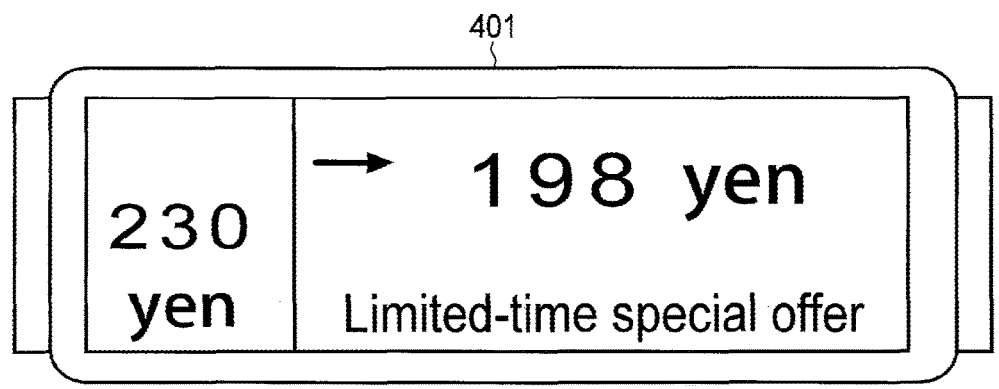
FIG. 18A shows an example of the external appearance of a price tag device to which the above embodiments are applied.
Figure 18B:
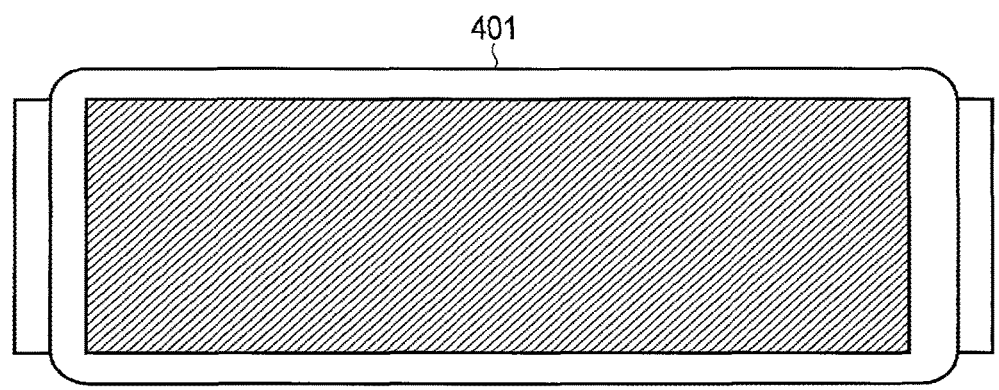
FIG. 18B shows an example when the price tag device shown in FIG. 18A has been changed to a particular display state.

FIG. 18A and FIG. 18B show the external appearance of a price tag device 401 to which the above embodiments are applied. The price tag device 401 is used to show advertising information. The image of the display panel of the price tag device 401 is controlled to be displayed in a normal display state (first display state) and a particular display state (second display state) by the above embodiments. FIG. 18A shows a normal display state. In the example of FIG. 18A, the price of the merchandise has been changed from 230 yen to 198 yen. In the example of FIG. 18B, a normal display state has been switched to a particular display state (in this case, to black display on the whole screen).

The present invention is not limited to the above embodiments. In the above embodiments, the gradation of pictures or background images is not particularly explained. However, the present invention can be applied to display devices in which pictures and background images can be displayed with gradation.

Figure 19A:
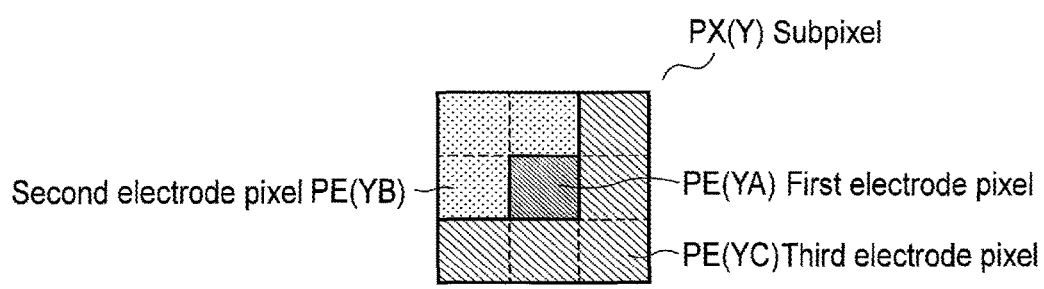
FIG. 19A shows an example of the basic structure of a subpixel which can exhibit a plurality of gradations.

The subpixel PX(Y) shown in FIG. 19A comprises, for example, three pixel electrodes PE(YA), PE(YB) and PE(YC). Pixels comprising respective pixel electrodes PE(YA), PE(YB) and PE(YC) can be independently controlled to be on or off. In this manner, the gradation (luminance) can be changed in the whole subpixel PX(Y). The areas of pixel electrodes PE(YA), PE(YB) and PE(YC) are different from each other. As shown in FIG. 19B, eight gradation types Y1 to Y8 can be exhibited by independently controlling the on- and off-states of the pixels comprising pixel electrodes PE(YA), PE(YB) and PE(YC).

Each of the pixels comprising pixel electrodes PE(YA), PE(YB) and PE(YC) independently comprises a memory. The operation principle of each pixel is the same as that explained with reference to FIG. 3 and FIG. 4.

FIG. 20A shows an example in which background images (left and right dark areas IMG1 and IMG2) and a picture (vertical bright area IMG3 like a belt) are displayed on the display panel PNL. A pixel array line HLn is shown laterally in the display area as an example. The pixel array line HLn includes pixels PX1 to PX10. In the example, pixels PX1 to PX4 belong to area IMG1. Pixels PX7 to PX10 belong to area IMG2. Pixels PX5 and PX6 belong to area IMG3. In this example, area IMG1 including pixels PX1 to PX4, and area IMG3 including pixels PX7 to PX10 have gradation Y3 (slightly dark). Area IMG3 including pixels PX5 and PX6 has gradation Y6 (slightly bright). Gradation is determined in accordance with the value of data of the memory group MG (see FIG. 19B).

Figure 20B:
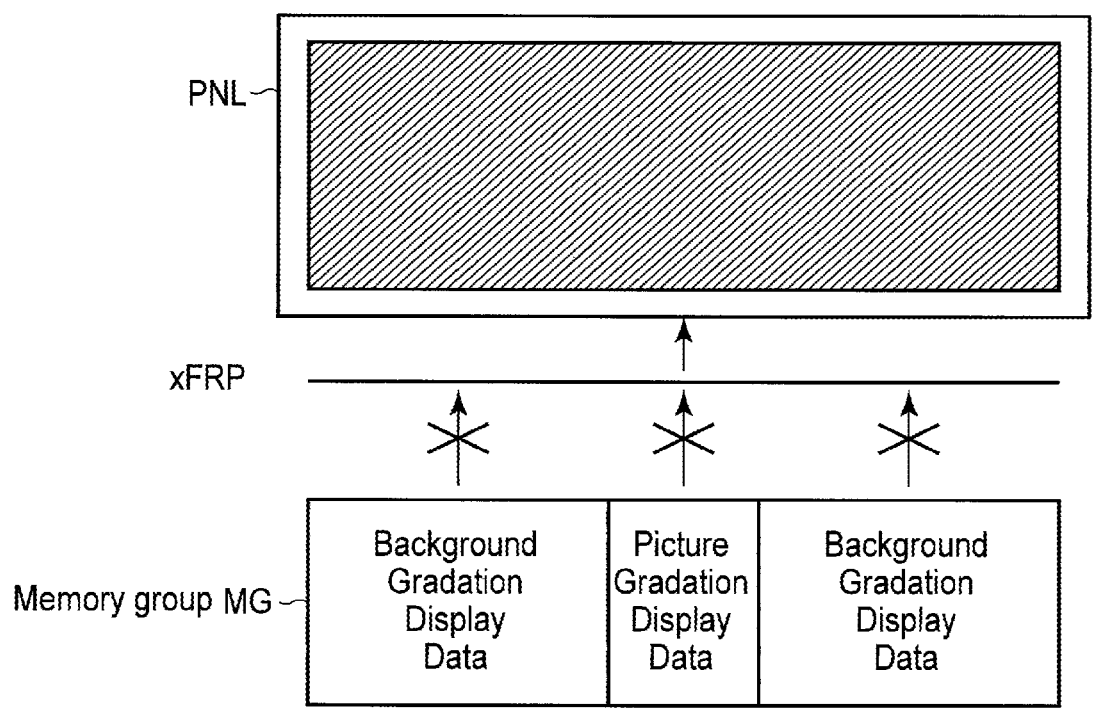
FIG. 20B is shown for explaining a display example when the display panel of FIG. 20A has been switched to a particular display.

When control is performed to change the whole screen to black as the eye-catching effect, as shown in FIG. 20B, the whole screen of the display panel PNL is changed to black display. At this time, all the pixels are driven by signal xFRP and the common signal VCOM regardless of the storage data of the memory group MG.

The display device described in each embodiment is preferably used to show advertising information. As advertising information, the image of an item of merchandise or the image of the price of an item of merchandise can be considered. According to the invention described in each embodiment, the display state can be switched to the particular second display state such as white or black blinking without changing the signal stored in memory M0. Thus, display can be performed with the eye-catching effect enhanced and the power consumption reduced.

A specific display device can be controlled such that the display state is changed to the second display state in a remote place inside the store by performing a remote operation using wireless communication. When the area of the shop is large, or when the shop has a large number of display devices, there is no need to move to the place of a specific display device to change the display state. In particular, when the display device of the present invention is used as the price tag of an item of merchandise as shown in FIG. 18A and FIG. 18B, the price tag is provided for each item of merchandise. Thus, the number of display devices is huge. However, when the display state is controlled by a remote operation, there is no need to move to the place of each display device many times.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a plurality of pixels each including a memory for storing a digital signal, a pixel electrode, a common electrode opposed to the pixel electrode, a selector circuit including a first switching element and a second switching element; and
a first drive line and a second drive line supplying a voltage to the plurality of pixels,
wherein
the first switching element connects the pixel electrode and the first drive line based on output of the memory,
the second switching element connects the pixel electrode and the second drive line based on output of the memory,
in a first mode, the first drive line supplies a first signal having a polarity opposite to a signal supplied to the common electrode, and the second drive line supplies a second signal having a same polarity as the signal supplied to the common electrode,
in a second mode, the first drive line supplies the first signal and the second drive line supplies the first signal, and
in a third mode, the first drive line supplies the second signal and the second drive line supplies the second signal.

2. The display device of claim 1, wherein
a display of a whole screen of the display device is changed from white to black by change from the second mode to the third mode.

3. The display device of claim 1, wherein
a display of a whole screen of the display device is blinked on and off by change of the second mode and the third mode.

4. The display device of claim 1, wherein
a display of a whole screen of the display device is changed from white to black without change of the digital signal which is stored by the memory.

5. A display device comprising:
a plurality of pixels each including a memory for storing a digital signal, a pixel electrode, a common electrode opposed to the pixel electrode, a selector circuit including a first switching element and a second switching element;
a first drive line and a second drive line supplying a voltage to the plurality of pixels; and
a mode control circuit for selectively setting a first mode, a second mode and a third mode,
wherein
the first switching element connects the pixel electrode and the first drive line based on output of the memory,
the second switching element connects the pixel electrode and the second drive line based on output of the memory,
in the first mode, the first drive line supplies a first signal having a polarity opposite to a signal supplied to the common electrode, and the second drive line supplies a second signal having a same polarity as the signal supplied to the common electrode,
in the second mode, the first drive line supplies the first signal and the second drive line supplies the first signal, and
in the third mode, the first drive line supplies the second signal and the second drive line supplies the second signal.

6. The display device of claim 5, wherein
a display of a whole screen of the display device is changed from white to black by the mode control circuit selecting a mode from the second mode to the third mode.

7. The display device of claim 5, wherein
a display of a whole screen of the display device is blinked on and off by the mode control circuit selecting the second mode and the third mode.

8. The display device of claim 5, wherein
a display of a whole screen of the display device is changed from white to black without change of the digital signal which is stored by the memory.

* * * * *